May 12, 1964 R. L. BICKERDIKE ETAL 3,132,979
PROCESS OF MAKING AN IMPERMEABLE COMPOSITE CARBON TUBE
Filed Feb. 3, 1960
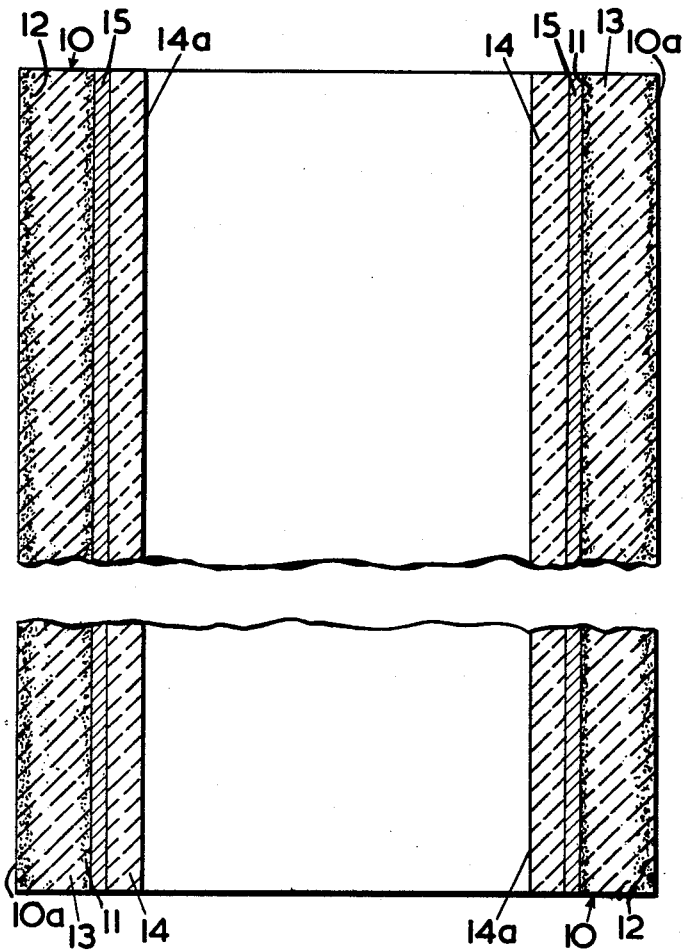
INVENTORS
ROBERT LEWIS BICKERDIKE
ANTHONY REGINALD GEORGE BROWN
GARYTH HUGHES
WILLIAM JOHNSON
WILLIAM WATT
By
Attorney

United States Patent Office 3,132,979
Patented May 12, 1964

3,132,979
PROCESS OF MAKING AN IMPERMEABLE COMPOSITE CARBON TUBE
Robert Lewis Bickerdike and Anthony Reginald George Brown, Farnham, Garyth Hughes, Mytchett, and William Johnson and William Watt, Farnborough, England, assignors to United Kingdom Atomic Energy Authority, London, England
Filed Feb. 3, 1960, Ser. No. 6,410
Claims priority, application Great Britain Feb. 10, 1959
3 Claims. (Cl. 156—89)

This invention relates to a process whereby tubular carbon articles may be made or treated in such a manner as to be highly impermeable.

The term "carbon" is to be understood to cover the form of carbon known as graphite.

The invention may embody in one or more stages any one or more of the processes described in copending U.S. patent applications Nos. 775,121, filed November 20, 1958, 776,682, filed November 28, 1958, and 779,420, filed December 10, 1958, now abandoned.

It may be remarked that prior proposals for making carbon articles especially carbon tubes have involved processes (including some of the aforementioned processes), which have, in some cases proved too slow and in others to give a tube of which the surfaces are susceptible to physical damage which may impair the impermeability.

The present invention is concerned with avoiding these disadvantages.

According to the invention a composite carbon tube is constructed of concentric united component tubes at least one of which has a substantially impermeable annular region throughout its length lying remote from the cylindrical surfaces of the composite tube.

The component tubes may be united by a process and/or may be rendered impermeable by a process according to any of the aforesaid applications, in particular by securing them together by using as an adhesive, a liquid organic compound polymerizable to the solid state and capable of being carbonized without passing through a liquid phase. Compounds such as furane derivatives, in particular furfuryl alcohol, are suitable for this purpose.

The process of rendering the component tubes impermeable may be performed before, during, or after construction of the composite tube; the joining together of the components may be effected by the same or another process.

The composite tube may be made of a one piece outer tube and a number of end to end separate inner tubes (or vice versa) which are secured together during the construction process.

Composite tubes having several layers may be constructed.

Several methods of constructing the composite tubes of the invention will now be described in the following examples.

*Example I*

A tube of graphite bore 0.5 inch, outside diameter 0.75 inch, length 20 inches, closed by a removable closure member at one end was heated in a flowing nitrogen and benzene atmosphere at 810° C. for 250 hours, the benzene partial pressure being about 4 cms. Hg. The tube thus treated was then highly impermeable, there being a zone or layer of the highest impermeability near its outer surface.

This tube was then cemented into another tube of bore 1.76 inches and outside diameter 1.0 inch internal height 20 inches, external height 20.5 inches as follows.

A mixture of 35 ccs. partially polymerized furfuryl alcohol with 25 grams natural graphite powder of size passing a 200 mesh B.S.S. sieve, was made up. When mixing was complete 0.5 cc. conc. HCl was incorporated by thorough stirring. This mixture was then painted on to the outer surface of the smaller tube and poured into the larger tube which was then manipulated so as to cover the internal surface with the mixture. The smaller tube was then slid into the larger one. Pressure had to be used in the latter stages to push the inner tube right in and force air out from the annular space between the tubes. The composite tube was then treated at room temperature for 48 hours, then heated from 40° C. up to 180° C. over 24 hours to polymerize the resin. It was then further heated up to 1000° C. while embedded in lampblack, the rate of temperature rise from 100° to 1000° C. being linear over 3 days.

The composite tube was then given impregnation treatment with furfuryl alcohol containing a small amount of $H_3PO_4$ as catalyst to reduce the permeability of the outer tube and increase its oxidation resistance, as follows. The tube was totally immersed in ages furfuryl alcohol to which 1.6% by volume of phosphoric acid of density 1.75 g./cm.$^3$ had been added. While immersed, the container was evacuated, exhaustion pumping being maintained for 1 hour, and the pressure was then increased to atmospheric, and the tube left immersed for another hour. The tube was then removed, wiped, and the resin partially cured at laboratory temperature for 48 hours, then fully cured by heating from 40° to 180° C. for 24 hours, and finally carbonized in lampblack to 1000° C. as before.

The permeability of the composite tube thus made was $2 \times 10^{-7}$ cms.$^2$/sec. and the most impermeable zone was now midway between the inner and outer surfaces. The phosphoric acid as catalyst had the effect of increasing the oxidation resistance of the outer tube.

*Example II*

A graphite tube outside diameter 2.125 inches, bore 1.885 inches, length 6 inches, of initial permeability $1.81 \times 10^{-2}$ cm.$^2$/sec. was treated in a flowing benzene-nitrogen atmosphere (the benzene partial pressure being 8 cms. Hg) as 850° C. for 120 hours, the weight increased by 6.29% and the impermeability to air increased to $5 \times 10^{-7}$ cm.$^2$/sec. Another tube outside diameter 1.875 inches, bore 1.75 inches, length 6 inches was taken and the outer surface of this, as well as the inner surface of the first tube, was painted with partially polymerized furfuryl alcohol to which 1% by vol. of conc. HCl had been added. After painting, both tubes were left for ½ hour then repainted to cover places where penetration had occurred. The inner tube was then slid into the outer, the excess liquid at the ends wiped off, and it was left for 2 days in air at room temperature to partially cure the alcohol; then heated to 180° C. over 24 hours to fully cure the alcohol and finally carbonized in lampblack to 1000° C. over 3 days. The final value of impermeability of the composite tube thus made was $5 \times 10^{-7}$ cm.$^2$/sec.

*Example III*

A graphite tube outside diameter 1.0 inch, bore 0.5 inch, length 2.5 inches was furfuryl alcohol impregnated once, cured and carbonized as in Example I. It was then heated in a vacuum to 1800° C. and impermeability was thereby improved to $4 \times 10^{-5}$ cm.$^2$/sec. The tube was then machined to an outside diameter of 0.755 inch and the impermeability fell to $1 \times 10^{-4}$ cm.$^2$/sec.

The tube was then treated in a flowing nitrogen-benzene atmosphere for 64 hours at 850° C. (the benzene partial pressure was 8 cm. Hg) and the impermeability was improved to $1 \times 10^{-8}$ cm.$^2$/sec.

A second tube, outside diameter 0.75 inch, bore 0.5 inch, length 2.5 inches was then glued into the first with furfuryl alcohol (no filler) as in 39,160/57 and the assembly subjected to atmospheric temperature and elevated temperature treatments to partially and fully cure the alcohol and carbonize the resin thus formed, as in Example I.

The final impermeability of the composite tube was better than $5 \times 10^{-9}$ cm.$^2$/sec., the most highly impermeable region lying midway between the inner and outer surfaces.

In order to test the value of this process a 0.05 inch thick layer was machined from the outer surface of the tube but no reduction in the impermeability of tube could be measured.

*Example IV*

A graphite tube, length 6 inches, outside diameter 1.0 inch, inside diameter 0.75 inch was treated by total immersion in furfuryl alcohol containing 0.2% by volume of concentrated hydrochloric acid, the container then being evacuated for 30 minutes. After this the container pressure was raised to atmospheric and the tube allowed to soak in the alcohol for 2 hours. The tube thus absorbed about 8.1% by weight of the alcohol. The tube was then gently heated to 120° C. to polymerize the impregnant alcohol and thereafter first heated to 1100° C. in vacuum to carbonize the impregnant and then further heated to 1800° C. in vacuum to complete the carbonizing treatment. The carbon pick up was 3.74% by weight and the permeability fell to $6 \times 10^{-6}$ cm.$^2$/sec. In the next stage the tube was given a gas deposition treatment in a nitrogen-benzene mixture at 850° for 64 hours (benzene partial pressure 8.25 cms. Hg). An untreated liner tube of graphite, outside diameter 0.75 inch, inside diameter 0.5 inch was then coated with partially polymerized furfuryl alcohol as a cement, and slid into the outer tube. The composite tube was then heated gently to cure the cement and further heated to carbonizing temperature. After carbonization a layer of thickness of 0.04 inch was removed from the outer surface of the composite tube by machining, and the permeability was measured in two different sets of apparatus. In both cases the value obtained was $2 \times 10^{-9}$ cm.$^2$/sec.

The drawing illustrates a type of impermeable structure formed by the process of the invention. The sole figure is a side view in cross section of a composite carbon tube.

In the drawing an outer tube 10 has substantially impermeable annular regions 11, 12 created by the deposition of carbon in the pores in these regions by means of, in one stage, impregnation with furfuryl alcohol followed by polymerization and carbonizing treatments, and, in the next stage, by the deposition of carbon in the remaining pores by the pyrolysis of the vapor of a hydrocarbon compound. The intermediate region 13 of the tube 10 is also highly impermeable but not to the level of the regions 11 and 12. It is to be understood that the boundaries of these regions will not, in practice, be sharply defined. The inner tube 14 is in the untreated permeable state. The two tubes are united at the interface 15 by means of a film of carbonized adhesive originally furfuryl alcohol, which, when carbonized in this situation joins the inner and outer tubes by means of a highly impermeable carbon film partly between the tubes 10 and 14 and partly penetrated in the pores of the contiguous faces of the tubes. The composite tube therefore has three impermeable zones of which two, namely the annular region 11 and the film at the interface which are both remote from the faces 10a, 14a of the wall of the composite tube.

The invention gives carbon or graphite tubes having at least one substantially impermeable layer in a region remote from the exposed inner or outer tube surface as well as other impermeable regions, whereby the impermeability of the tube will remain unimpaired by surface damage. Additionally, the initial porosity of any of the component tubes is relatively unimportant as the two or more stages of the invention ensure that the end product will be substantially impermeable.

It will be apparent to those skilled in the art that numerous other combinations of the processes of the above-mentioned patent applications may be made and applied to the construction of composite substantially impermeable carbon tubes according to the invention.

We claim:
1. A process of making an impermeable composite carbon tube from porous component carbon tubes comprising the steps of treating at least one permeable component tube by depositing carbon in the pores thereof in an annular region which region includes at least a curved surface portion of the wall thereof to render the wall of the component tube substantially impermeable in the radial direction, uniting the treated tube with at least one other permeable component tube of comparable permeability concentric and contiguous therewith by means of an adhesive consisting essentially of a liquid organic compound polymerizable to a solid state and carbonizable to form a carbon bond uniting said component tubes to form a composite tubular article, curing the composite tubular article to polymerize said adhesive and heating the composite article to carbonize the polymerized adhesive, whereby the component tubes are so arranged that the annular impermeable region of the treated component tube forms an interior region of the wall of the composite tubular article separated from the inner surface of the inner component tube and from the outer surface of the outer component tube by annular regions of said component tubes which are less impermeable than said impermeable region, said less impermeable annular regions being of comparable porosity.

2. A process as claimed in claim 1 in which the step of depositing carbon in the pores of the one component tube comprises impregnating the pores with a liquid impregnant in the form of a liquid organic compound polymerizable to the solid state and carbonizable without passing through a liquid phase, polymerizing the impregnant and then heating the tube to carbonize the polymerized impregnant.

3. A process as claimed in claim 2 in which the step of depositing carbon in the pores of the one component tube comprises pyrolytically depositing carbon in the pores from the vapor of a hydrocarbon compound.

References Cited in the file of this patent

UNITED STATES PATENTS

| | | |
|---|---|---|
| 2,076,078 | French | Apr. 6, 1937 |
| 2,300,503 | Hamister et al. | Nov. 3, 1942 |
| 2,512,230 | Greaves et al. | June 20, 1950 |
| 2,782,806 | Stambaugh et al. | Feb. 26, 1957 |
| 2,807,282 | Watts et al. | Sept. 24, 1957 |
| 2,962,386 | Doll et al. | Nov. 29, 1960 |
| 2,972,552 | Winter | Feb. 21, 1961 |